W. E. COOKE.
CORN HARVESTER.
APPLICATION FILED APR. 2, 1914.

1,165,758.

Patented Dec. 28, 1915.
6 SHEETS—SHEET 1.

Fig. 1.

Witnesses
E. C. Skinkle
U. H. Opsahl

Inventor
William E. Cooke
By his Attorneys
Williamson Merchant

UNITED STATES PATENT OFFICE.

WILLIAM E. COOKE, OF HARVEY, NORTH DAKOTA.

CORN-HARVESTER.

1,165,758.

Specification of Letters Patent.

Patented Dec. 28, 1915.

Application filed April 2, 1914. Serial No. 829,034.

*To all whom it may concern:*

Be it known that I, WILLIAM E. COOKE, a citizen of the United States, residing at Harvey, in the county of Wells and State of North Dakota, have invented certain new and useful Improvements in Corn-Harvesters; and I do hereby declare the following to be a full, clear, and exact description of the invention, such as will enable others skilled in the art to which it appertains to make and use the same.

My invention has for its object to provide an improved corn harvester, adapted not only to cut the standing stalks, but also to immediately cut the stalks, ears and all, into ensilage; and to such ends, generally stated, the invention consists of the novel devices and combinations of devices hereinafter described and defined in the claims.

In this improved harvester, I provide means whereby the corn stalks, while standing, will, under the advance movement of the machine, be bent forward into inclined positions and cut from the stubble while thus forwardly bent. The knives for cutting the stalks from the stubble are, *per se*, of novel construction. Directly at the rear of the knives for cutting the standing stalks is an ensilage cutter to which the cut stalks are directly fed butt end rearward.

To prevent the stalks from falling onto the ground after they have been forwardly bent and then cut off, there is provided a movable support of novel construction located in front of the stalk severing cutters or knives. These stalk severing cutters or knives may be treated as primary stalk cutters and the ensilage cutter as a secondary stalk cutter. Coöperating feed rollers are preferably provided to directly and immediately engage with rearwardly turned butt ends of the cut stalks, and to positively feed the stalks to the ensilage cutter.

The improved harvester also involves certain other novel and highly important features, which, as well as those above noted, will be hereinafter fully described and defined in the claims.

In the accompanying drawings which illustrate the improved harvester, like characters indicate like parts throughout the several views.

Referring to the drawings.

The harvester illustrated is arranged to be drawn forward by horses and the primary and secondary cutters, and various other running parts of the harvesting mechanism are arranged to be driven by a small explosive engine carried on the harvester. It will, however, be understood that the novel features of my invention may be incorporated in an engine driven tractor, or machine wherein the forward traveling movement is produced by an engine.

The main frame 1 of the harvester is an approximately horizontally disposed rectangular structure which is supported on two good sized wheels 2, journaled to the opposite end portions thereof, and capable of independent rotation, so that the machine may be easily turned around.

At one side, to-wit, as shown, at its right hand side, the main frame 1 is provided with laterally spaced, forwardly projecting lower frame bars 3 and corresponding upper frame bars 4, and various coöperating braces, which constitute a sort of a bifurcated forwardly extended supplemental frame for supporting various devices to be hereinafter noted. Near its left hand side, the frame 1 has a suitably secured forwardly projecting stub pole 5, that is pivoted to the axle of a two-wheeled truck indicated as an entirety by the numeral 6.

Forwardly diverging upright gathering boards 7 are supported by the forwardly projecting frame bars 3 and 4, and these gathering boards are arranged to direct the stalks to a pair of coöperating horizontally disposed feed rollers 8 and 9. The rotary knives of the primary or stalk cutter are approximately horizontally disposed and are located in front of the feed rollers 8 and 9, and their blades are arranged to coöperate with a shearing blade 10, rigidly secured at the front portion of a table 11 that is rigidly secured to the lower frame bars 3 and to adjacent portions of the main frame 1. The said primary or stalk cutter comprises two coöperating reversely driven cutters having radial blades 12 formed at their backs with upwardly extended flanges 13, and their hubs are rigidly secured to the lower ends of upright shafts 14 journaled in suitable bearings on the frame bars 3 and 4, and provided at their upper ends with beveled gears 15 that mesh with beveled gears 16 on the ends of the countershaft 17 that is journaled in suitable bearings 18 on the front ends of the upper frame bars 4. One of the said shafts 14 is also provided with a sprocket 19. A sprocket chain 20 runs over the sprocket 19 and over a sprocket 21 on the upper end of an upright shaft 22, journaled in suitable bearings on the main frame 1, and provided at its lower end with a beveled gear 23.

The ensilage cutter, which is located just at the rear of the feed rollers 8 and 9, as shown, comprises a fixed shearing blade 24 and a co-operating knife-equipped cutter head 25 of the lawn mower type, but of heavier construction, and which head is secured to a transverse counter shaft 26 journaled in suitable bearings on the frame 1, and provided with a beveled gear 27 that meshes with the beveled gear 23 of the upright shaft 22. At its extreme end, the shaft 26 has a spur gear 28 that meshes with a spur gear 29 carried by a shaft 30 journaled in suitable bearings on the main frame 1. This shaft 30 is co-axial with the crank shaft 31 of a small explosive engine 32, which engine is carried by the main frame 1. For coupling the said shaft 30 to the end of the crank shaft 31 at will, the said shafts, respectively, are provided with coöperating friction clutch wheels 33 and 34, the former of which is mounted to slide on, but rotated with the shaft 30, and the latter of which is secured to the said engine crank shaft. Sliding movements of the clutch wheel 33 may be produced by any suitable means, but as shown, this is adapted to be accomplished by a shipper lever 35, a link 36, a bell crank 37 and a latch lever 38, all suitably mounted on the main frame, and the said latch lever coöperating with a lock segment 39 rigidly secured to said main frame.

Figure 2:
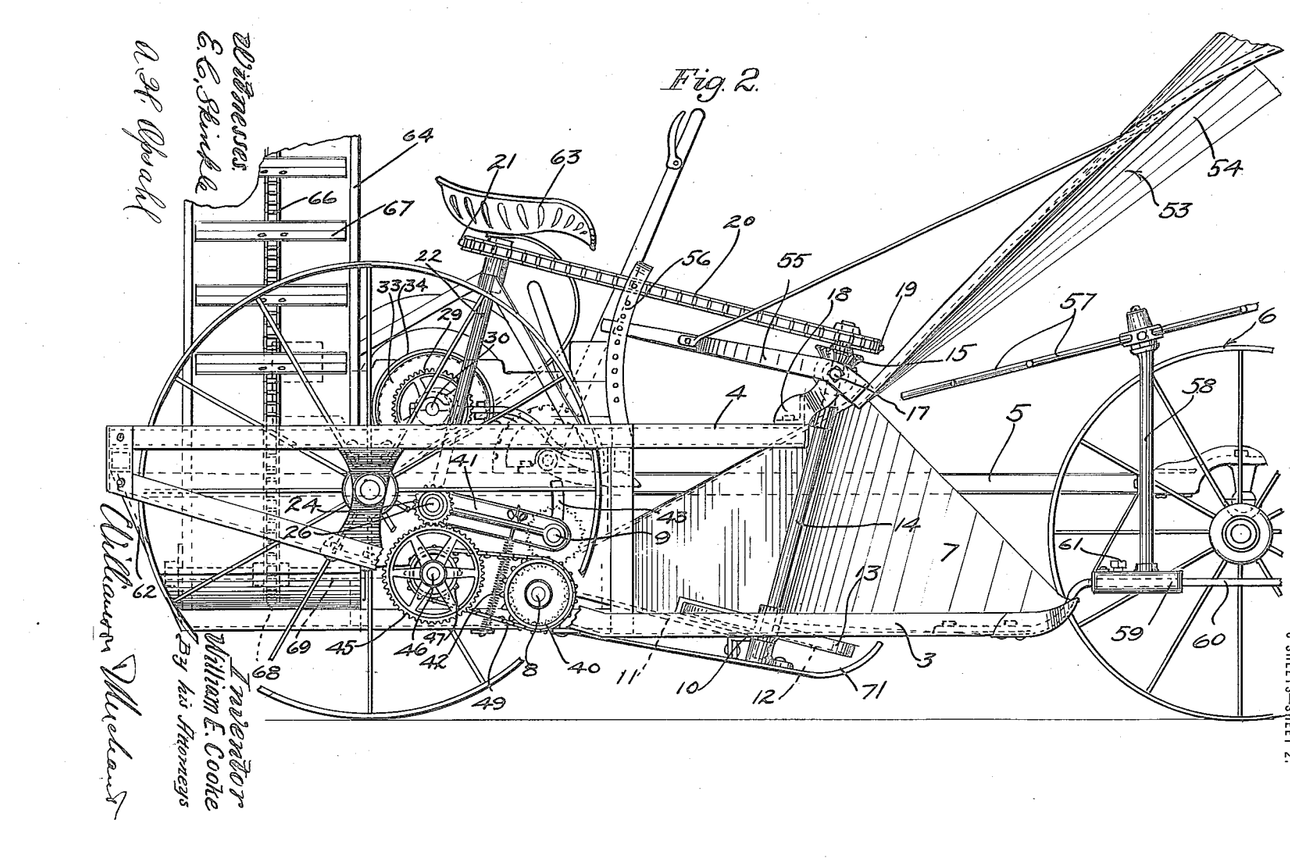
Fig. 2 is a right side elevation of the harvester.

Returning to the consideration of the feed rollers 8 and 9, it will be noted that the shaft of the lower feed roller 8 is journaled in fixed bearings on the main frame 1 and is provided at its outer end with a sprocket 40, while the shaft of the upper feed roller 9 is journaled in the free ends of a pair of vertically movable arms 41, (see Figs. 2 and 3), that are pivoted on or around the shaft 26 of the rotary ensilage cutter 25. The said arms 41 are preferably yieldingly drawn downward both by gravity and by adjustable tension springs 42, and the shaft of the said upper roller 9 works freely in segmental slots 43 formed in certain of the vertical plates of the main frame 1 (see Figs. 2 and 3).

At its extreme right hand end, the shaft 26 is provided with a spur pinion 44 that meshes with a spur gear 45 secured on a lower counter shaft 46, journaled in suitable bearings on the main frame 1 and provided at one end with a sprocket 47, and at its other end with a beveled gear 48. A sprocket chain 49 runs over the sprocket 47 and over the sprocket 40, to impart rotary movement to the lower feed roller 8 (see Fig. 2).

Figure 3:
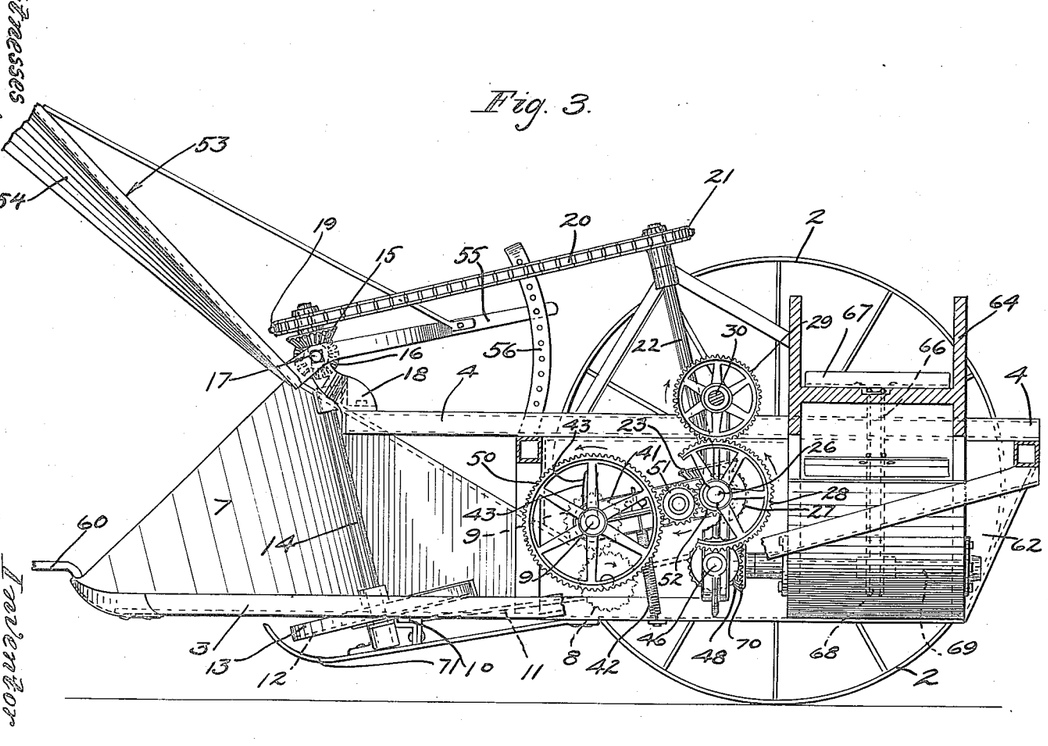
Fig. 3 is a vertical section taken on the line $x^3$ $x^3$ on Fig. 4.
Figure 4:
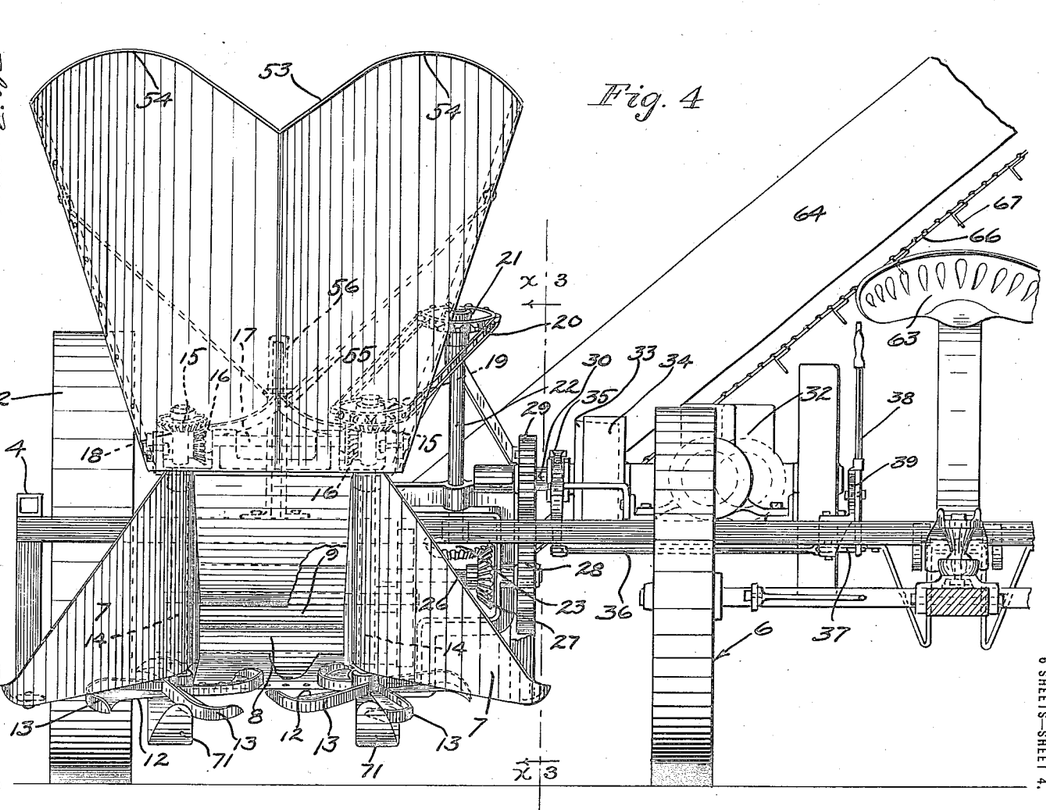
Fig. 4 is a front elevation of the harvester with some parts broken away and some parts removed.

On the inner end of the shaft of the upper feed roller 9 is a spur gear 50 that meshes with an intermediate pinion 51 on the adjacent arm 41 and this pinion 51 meshes with a similar pinion 52 on the shaft 26 (see Fig. 3). By these connections just described, the upper feed roller 9 will be driven reversely to the feed roller 8, so that the said feed rollers 8 and 9 will coöperate to feed the stalks endwise to the ensilage cutter, and the said upper roller will be free to rise and fall to adapt the said rollers to the passage of the stalks and ears between them.

As a simple and efficient means for bending the standing corn stalks forward under the advance movement of the machine, and before they are cut, I provide a so-called stalk deflector in the form of a sheet metal hood 53, which is bent to form two inverted channels terminating in front in two approximately V-shaped gathering crotches 54, the purpose of which will hereinafter appear. This gathering hood inclines rearward, and at its rear end is attached to the pronged end of an adjusting lever 55, that is pivoted to a bearing 18 (see Fig. 2). The rear end of the lever 55 coöperates with a perforated lock segment 56 on the main frame 1, to adjustably hold the deflecting hood 53 set at the desired height and angle for action on the standing stalks.

Below the hood 53 but above and in front of the stalk cutters 12 is a pair of coöperating reels 57 of the turnstile type, the hubs of which are loosely journaled on supporting columns 58, which, as shown, are rigidly secured to bearing blocks 59 mounted to slide on bearing bars 60, rigidly secured to the front ends of the lower frame bars 4. The blocks 59 are provided with set screws 61 for securing them in different positions, forwardly and rearwardly of the machine, on the said bars 60.

Figure 5:
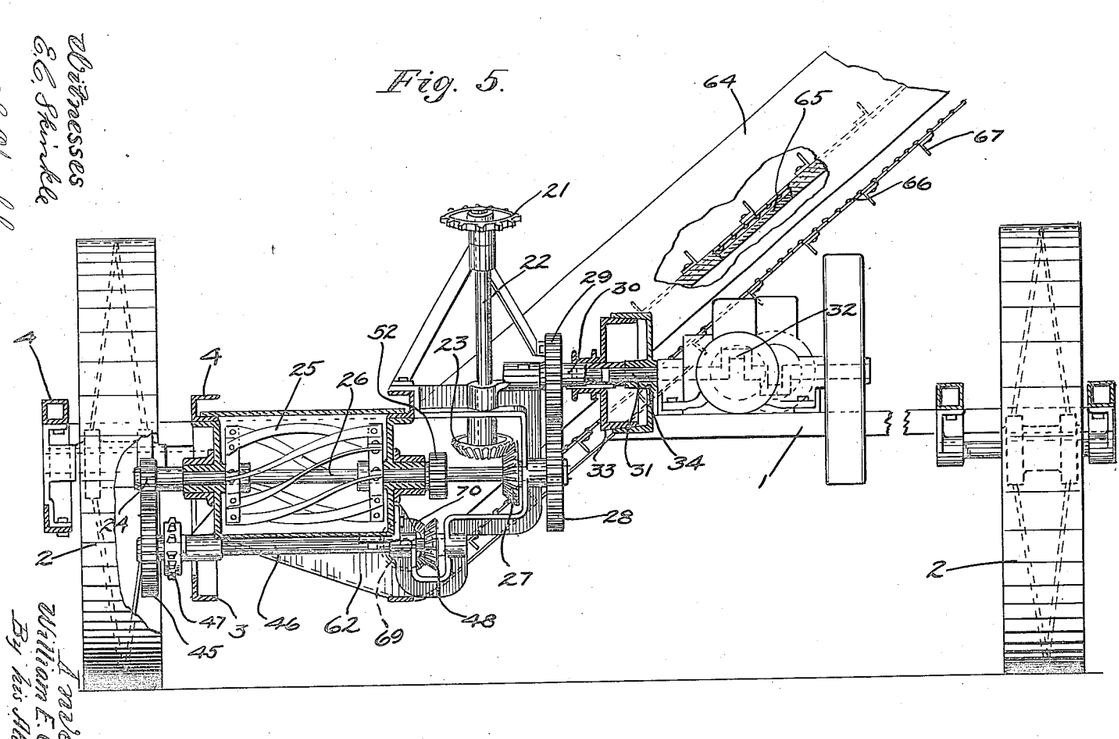
Fig. 5 shows the harvester partly in front elevation, but with certain of the parts sectioned approximately on the line $x^5$ $x^5$ on Fig. 1.

At the rear of the ensilage cutter is a receiving pan 62 (see particularly Figs. and 6), and rising obliquely from the said pan and rigidly supported by the main frame 1 and extending toward the left hand side thereof (directions being taken in respect to the driver seated on the driver's seat 63), is an elevator frame 64 having an inclined deck 65. Working over and below the deck 65 is an endless elevator belt shown as made up of chains 66 and cross slats 67. The upper portion of the sprocket chain 66 runs over a sprocket wheel, not shown, located on the upper end of the elevator frame 64, and the lower portion of said chain runs over a sprocket 68, (see Figs. 1, 2 and 3), secured on a shaft 69, journaled in suitable bearings on the lower portion of said elevator frame, and provided at its front end with a beveled gear 70 (see Figs. 3 and 5) that meshes with the beveled gear 48 which is on the lower counter shaft 46.

Preferably, the rotary stalk cutters or knives 12 are prevented from engaging the ground by means of shoes or guard plates 71 rigidly secured to the lower frame bars 3, or other suitable support, and underlying the said cutters.

Figure 1:
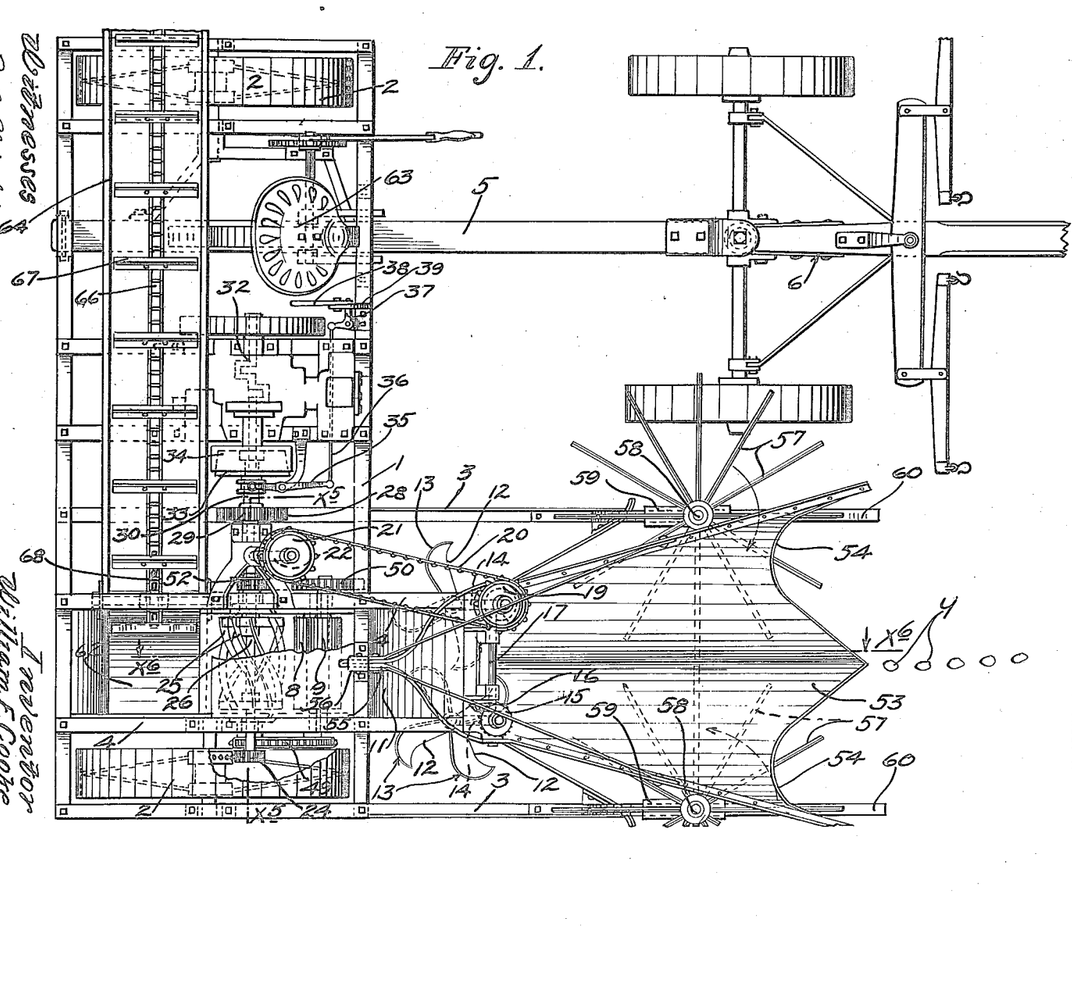
Figure 1 is a plan view of the improved harvester.
Figures 6, 7, 8:
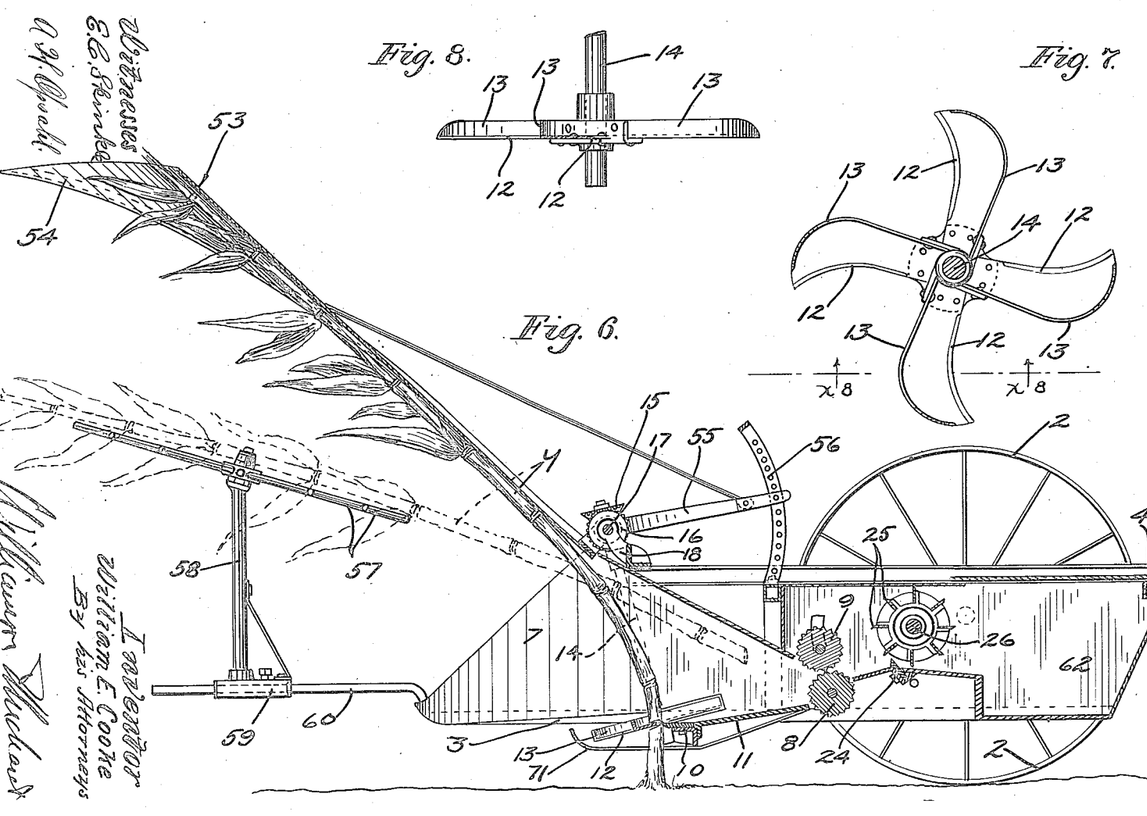
Fig. 6 is a vertical section taken approximately on the line $x^6$ $x^6$ on Fig. 1.
Fig. 7 is a plan view of one of the knives of the primary or stalk cutter.
Fig. 8 is a section taken on the line $x^8$ $x^8$ on Fig. 7.

Operation: In Fig. 1, the character y indicates a row of standing corn stalks which is to be cut by the machine. Under the advance movement of the machine, the deflecting hood will engage the upper portions of the stalks and bend them forward, approximately as shown in Fig. 6, and the gathering crotches 54 and channels of the said hood will cause the said stalks to bend forwardly, also laterally, either to one side or the other of the row. Also, under the advance movement of the machine and while the corn stalks are being bent forward and before they are cut, the standing stalks will be forced between the reels 57, and in passing to the rear thereof, will cause the said reels to rotate in the direction of the arrows marked thereon in Fig. 1.

Under continued advance movement of the machine, and when the corn stalks have been bent, approximately as shown in Fig. 6, and while their forwardly bent portions overlie the reels 57, the cutters 12 come into action on the stalks and cut them off, leaving only a short stubble standing on the ground. The corn stalks thus cut, will fall onto the reels 57, as indicated by dotted lines in Fig. 6, and will then occupy nearly horizontal positions, with their butt ends projecting toward and close to the feed rollers 8 and 9. As the reels 57 are kept under rotation by the standing stalks passing between the same, the cut stalks, which will then lie on the reels on opposite sides of the row of standing stalks, will be moved rearward until their butt ends are taken hold of by the feed rollers 8 and 9, and then the said stalks will be positively fed to the ensilage cutter, butt ends first; and this movement of the stalks, under the action of the feed rollers 8 and 9, while the stalks rest, in part, upon the reels, will further insure rotation of the said reels. As the stalks are thus cut in succession, they will be delivered in succession to the feed rollers, that is, in a sort of an overlapped arrangement with the butt ends of the first stalks ahead of those cut later, and this results in another important action, to-wit, that the ears on the stalks, which are simultaneously subject to the ensilage cutter will be delivered, one after the other, to the said ensilage cutter, thus avoiding excessive work or strain on the ensilage cutter, such as would result were a number of stalks, with their butt ends even, delivered to cutting mechanism. It will thus be seen that the corn stalks are bent forward before they are cut, and are cut and thrown into an approximately horizontal position with their butt ends rearward, before the stalks enter into the machine proper, and that upon entering the machine proper, the stalks are delivered directly to the ensilage cutter.

Stated in a slightly different way, the corn stalks are cut and turned butt ends rearward, in respect to the direction of travel of the machine, while the stalks are still in the field and are directly delivered to the ensilage cutter in the very act of delivering the stalks to the machine. The rotary reels or stalk supports will hold the laterally deflected stalks, some at one side and some at the other of the standing stalks of corn against which the machine is advancing, and this prevents interference with the proper cutting of the stalks.

It is here further important to note that in the act of cutting the standing stalks, the back flanges 13 on the cutters 12, strike the severed butt ends of the stalks and flip or throw the same inward and rearward, thus facilitating their alinement and proper delivery to the feed rollers 8 and 9.

The ensilage cut and delivered into the catch box 62 will be taken up by the elevator and delivered into the box of a wagon driven at the left hand side of the harvester.

The element 53 has herein been designated as a deflecting hood, but broadly. it is not necessarily in the form of a hood, but may take other forms. The gist of the thing is that it will engage the stalks to bend them forward in respect to the direction of travel of the machine and hold them thus bent while being cut, so that they will fall forward with their butt ends projecting rearward.

What I claim is:

1. In a corn harvester, a stalk cutter, a stalk bender projecting above and forward of said stalk cutter and operating to bend the stalks forward before they are cut, and to hold the same bent forward while they are being cut, a stalk supporter located directly in front of said stalk cutter and onto which the said stalk bender causes the cut stalks to directly fall butt ends rearward.

2. In a corn harvester, a stalk cutter, a stalk bender projecting above and forward of said stalk cutter and operating to bend the stalks forward before they are cut and to hold the same bent forward while they are being cut, a stalk supporter located directly in front of said stalk cutter and onto which the said stalk bender causes the cut stalks to directly fall butt ends rearward, an ensilage cutter directly at the rear of the said stalk cutter and stalk supporter, and means for feeding the cut stalks to said ensilage cutter butt ends rearward.

3. In a corn harvester, means for bending the stalks forward and for cutting them while bent forward, a movable support onto which the cut stalks fall with their butt ends rearward, an ensilage cutter located at the rear of and in line with said movable stalk support and arranged to act directly on the rearwardly extended butt ends of the said stalks, and means for delivering the stalks, butt ends rearward, from the support directly to said ensilage cutter.

4. In a corn harvester, the combination with a stalk cutter, of an ensilage cutter located directly at the rear thereof, a stalk deflector located above and projecting forward of said stalk cutter and arranged to bend the stalks forward before they are cut and into such position that the cut stalks will be fed butt ends rearward directly to said ensilage cutter, and means for delivering the stalks, butt ends rearward, from the support directly to said ensilage cutter.

5. In a corn harvester, the combination with a stalk cutter, of an ensilage cutter located directly at the rear of said stalk cutter, feed rollers located directly between said two cutters, means in front of said cutters to receive the cut stalks, a stalk deflector projecting above and forward of said stalk cutter and arranged to bend the stalks forward before they are cut, whereby the cut stalks will be delivered butt ends rearward directly to said feed rollers and thence to said ensilage cutter, and means for delivering the stalks, butt ends rearward, from the support directly to said ensilage cutter.

6. In a corn harvester, means for bending the stalks forward and for cutting the same, a stalk supporter located directly in front of the stalk cutting means and through which the standing stalks are passed and onto which the cut stalks directly fall, butt ends rearward, means for feeding the stalks butt ends rearward, and an ensilage cutter located directly at the rear of said stalk cutting means and to which the cut stalks are directly fed, butt ends rearward.

7. In a corn harvester, the combination with a stalk cutter, of a stalk bender projecting above and forward of said stalk cutter and operating to bend the stalks forward before they are cut and to hold the same bent forward while they are being cut, and a stalk supporter comprising a pair of rotary reels located directly in front of said stalk cutter and through which the standing stalks are passed and onto which the cut stalks are caused to directly fall by said stalk deflector, and which reels are given rotation by the standing stalks, whereby the said cut stalks are fed butt ends rearward.

8. In a corn harvester, the combination with means for bending the stalks forward and for cutting the same while bent forward, of a stalk supporter comprising a pair of rotary reels located directly in front of the stalk cutting means and through which the standing stalks are passed and onto which the cut stalks directly fall, the said reels being given rotation by the standing stalks, whereby the said stalks are fed, butt ends rearward, and an ensilage cutter located directly at the rear of said stalk cutting means and to which the cut stalks are directly delivered, butt ends rearward.

9. In a corn harvester, means for bending the stalks forward and for cutting them while bent forward, a stalk supporter comprising a pair of rotary reels located in front of said cutting means and onto which the forwardly projecting portions of the cut stalks fall, and means for adjusting said reels forwardly and rearwardly.

10. In a corn harvester, the combination with a stalk cutter, of an ensilage cutter located directly at the rear thereof, and a stalk deflector having a longitudinal central dividing portion and deflecting portions arranged to deflect the stalks laterally as well as forwardly and arranged to hold the standing stalks thus bent and deflected while they are being cut from the stubble.

11. In a corn harvester, the combination with a stalk cutter, of an ensilage cutter located directly at the rear thereof, a stalk deflector having a longitudinal central dividing portion and deflecting portions arranged to deflect the stalks laterally as well as forwardly and arranged to hold the standing stalks thus bent and deflected while they are being cut from the stubble, and a pair of stalk supporting reels underlying the forwardly projecting portion of said deflector and onto which the forwardly bent portions of the cut stalks will fall.

12. In a corn harvester, the combination with a stalk cutter of a stalk bender projected above and forward of said stalk cutter and operating to bend the stalks forward before they are cut and to hold the same bent forward while the are being cut, and a two-part stalk supporter located in front of said cutter and having between the two parts thereof a passage through which standing stalks may pass under forward movement of the harvester.

13. In a corn harvester, a stalk cutter, an ensilage cutter located directly at the rear of said stalk cutter and alined therewith in a direction from front to rear of the machine, and means for turning the cut stalks into approximately horizontal position with their butt ends rearward and for feeding the same butt ends rearward to said ensilage cutter.

14. In a corn harvester, a stalk cutter, an ensilage cutter located directly at the rear of said stalk cutter and alined therewith in a direction from front to the rear of the machine, a device for turning the cut stalks into approximately horizontal position, butt ends rearward, and a feed device for delivering the stalks butt ends rearward from said stalk cutter directly to said ensilage cutter.

15. In a corn harvester, the combination with cutters for cutting standing stalks, of a two-part supporter located in front of said cutter, and having between the two parts thereof a passage through which standing stalks may be passed under forward movement of the machine, a stalk deflector projecting forward of said cutter above said stalk supporter, whereby it will bend the standing stalks forward before they are cut and hold the same bent forward while they are being cut, an ensilage cutter directly at the rear of said stalk cutter, and means for delivering the stalks, butt ends rearward, directly to said ensilage cutter.

16. In a corn harvester, the combination with cutters for cutting standing stalks, of a two-part supporter located in front of said cutter and having between the two parts thereof a passage through which standing stalks may be passed under forward movement of the machine, a stalk deflector projecting forward of said cutter above said stalk supporter, whereby it will bend the standing stalks forward before they are cut and hold the same bent forward while they are being cut, an ensilage cutter directly at the rear of said stalk cutter, the said parts of said stalk supporter being arranged to freely rotate and having overlapping parts, and means for delivering the stalks, butt ends rearward, directly to said ensilage cutter.

17. In a corn harvester, the combination with cutters for cutting the standing stalks, of a stalk supporter located directly in front of said stalk cutter and through which the standing stalks are passed, a stalk deflector causing the cut stalks to fall directly onto said stalk supporter, butt ends rearward, an ensilage cutter located directly at the rear of said stalk cutter, and means for moving said stalk supporter to deliver the stalks, butt ends rearward, directly to said ensilage cutter.

In testimony whereof I affix my signature in presence of two witnesses.

WILLIAM E. COOKE.

Witnesses:
HARRY D. KILGORE,
F. D. MERCHANT.